United States Patent
Koshikawa

(10) Patent No.: US 6,857,032 B2
(45) Date of Patent: Feb. 15, 2005

(54) IMAGE DATA INPUT DEVICE

(75) Inventor: Naoki Koshikawa, Tokyo (JP)

(73) Assignee: PENTAX Corporation, Tokyo (JP)

(*) Notice: Subject to any disclaimer, the term of this patent is extended or adjusted under 35 U.S.C. 154(b) by 331 days.

(21) Appl. No.: 09/811,519

(22) Filed: Mar. 20, 2001

(65) Prior Publication Data

US 2001/0027518 A1 Oct. 4, 2001

(30) Foreign Application Priority Data

Mar. 28, 2000 (JP) .................................... P2000-089056

(51) Int. Cl.⁷ ............................................ G06F 13/12
(52) U.S. Cl. ........................... 710/62; 710/30; 710/39; 710/72; 712/225; 709/202
(58) Field of Search ............................ 710/5, 7, 20, 30, 710/62, 63, 64, 72, 18, 39, 52, 74; 712/225, 62; 382/254; 348/211; 709/202

(56) References Cited

U.S. PATENT DOCUMENTS

| | | | | |
|---|---|---|---|---|
| 5,073,965 A | * | 12/1991 | Konishi et al. ................ 382/47 |
| 5,231,501 A | | 7/1993 | Sakai | |
| 5,359,427 A | | 10/1994 | Sato | |
| 5,404,441 A | * | 4/1995 | Satoyama .................... 395/115 |
| 5,432,532 A | * | 7/1995 | Mochimaru et al. ......... 347/176 |
| 5,438,359 A | | 8/1995 | Aoki | |
| 5,517,409 A | * | 5/1996 | Ozawa et al. .......... 364/419.03 |
| 5,684,942 A | * | 11/1997 | Kimura ....................... 345/473 |
| 5,778,177 A | * | 7/1998 | Azer .......................... 709/202 |
| 5,973,729 A | * | 10/1999 | Washizu ...................... 348/96 |
| 6,173,082 B1 | * | 1/2001 | Ishida et al. ................. 382/245 |
| 6,238,344 B1 | * | 5/2001 | Gamelsky et al. .......... 600/437 |
| 6,256,452 B1 | | 7/2001 | Yamamoto | |
| 6,476,862 B1 | * | 11/2002 | Tatsumi et al. ............. 348/211 |

* cited by examiner

Primary Examiner—Jeffery Gaffin
Assistant Examiner—Ri Jue Mai
(74) Attorney, Agent, or Firm—Greenblum & Bernstein, P.L.C.

(57) ABSTRACT

An image data input device comprises a scanner, which has a SCSI driver and a connector, and a personal computer, which has a SCSI cable. The scanner is connected to the personal computer through the SCSI driver, the connector and a SCSI cable. The scanner is provided with an EEPROM, in which an application program, for processing digital image data obtained by the scanner, and an installation program are stored. The personal computer recognizes the EEPROM as an external storage, and performs an installation operation of the application program when the scanner is connected to the personal computer.

6 Claims, 11 Drawing Sheets

FIG. 10A

```
<PRESENT ID NUMBER>
   → SCANNER UNIT : 1
     MEMORY UNIT  : 0
```

FIG. 10B

```
<PRESENT ID NUMBER>
     SCANNER UNIT : 1
   → MEMORY UNIT  : 0
```

FIG. 10C

```
<PRESENT ID NUMBER>
     SCANNER UNIT : 1
   → MEMORY UNIT  : 1
     ERROR!
     DUPLICATED IDS
```

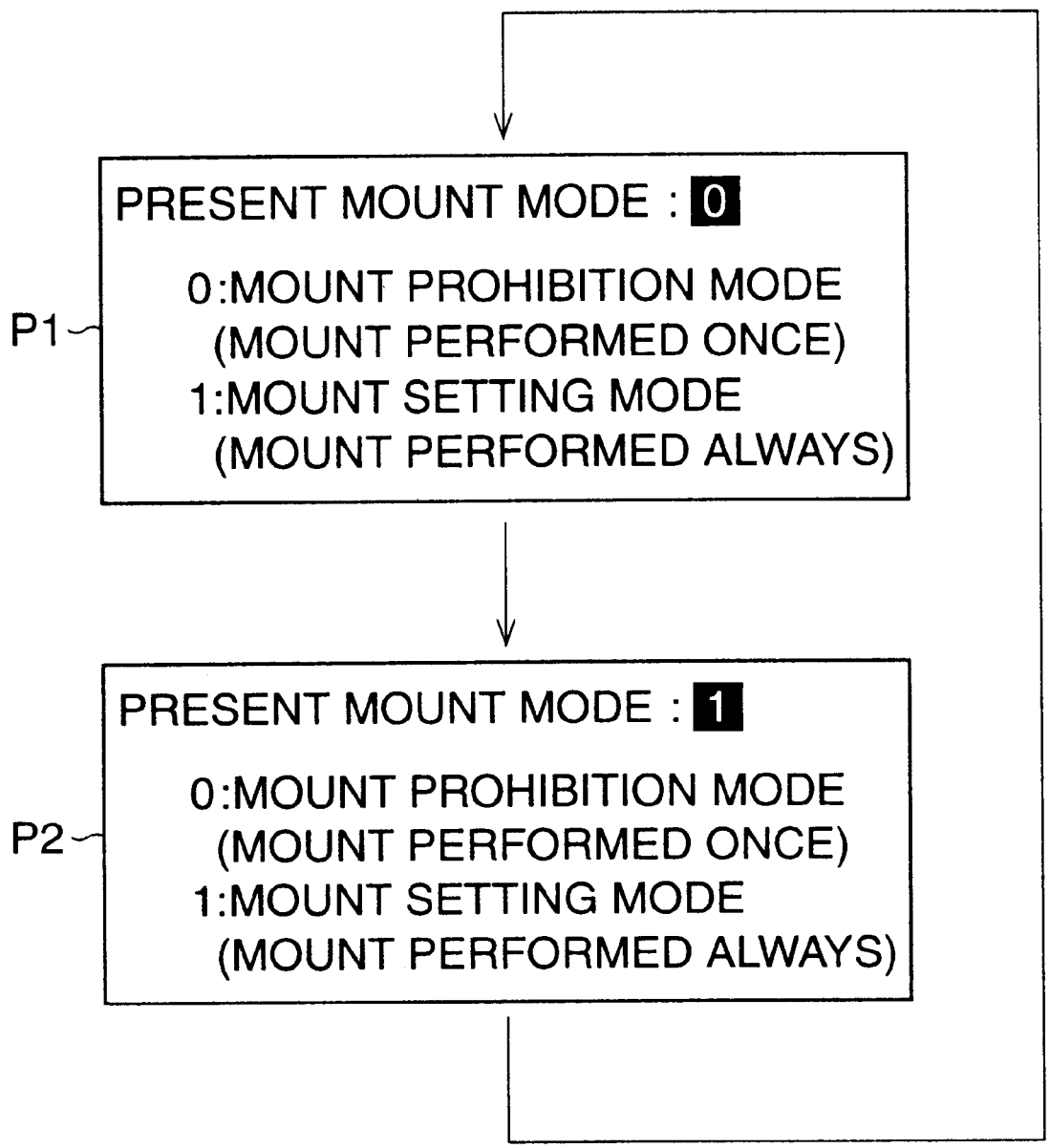

IMAGE DATA INPUT DEVICE

BACKGROUND OF THE INVENTION

1. Field of the Invention

The present invention relates to an image data input device, which generates digital data of an image and inputs the digital data into an image processing device such as a personal computer.

2. Description of the Related Art

Due to the progress of digital technology in recent years, image processing has been broadened, whereby images are handled in the form of digital image data and image-processed in an image processing device such as a personal computer (hereinafter referred to as a PC). An image data input device, in which digital image data of still images are generated and output to the PC, includes an electronic still camera which photoelectric-converts an optical image of an object to obtain digital image data, and a film scanner which reads a developed image on a silver halide film to generate digital image data. These image data input devices are connected to a PC, for example, through a cable, and the digital image data is output under control of the connected PC.

In order to image-process in the PC, it is necessary to install a specific application program, corresponding to the standard of the image data input device, into the PC prior to image processing. Conventionally, the installation is performed using an external recording medium such as a CD-ROM or a floppy disk, which is detachably mounted to the image data input device and in which the application program is stored.

However, the method by which the installation is performed for each type PC, and especially for a beginner, it is not easy to connect the image data input device and carry out the installation in the PC. Further, since the CD-ROM is separate from the image data input device, the handling of the CD-ROM is cumbersome.

SUMMARY OF THE INVENTION

Therefore, an object of the present invention is to provide an image data input device in which the installation of the application program corresponding to the image data input device is easy.

According to the present invention, there is provided an image data input device, which is connected to an image processing device through an interface so that digital image data are generated based on an optical image of an object and input to the image processing device, the image data input device comprising a program storing unit and a control unit that controls the interface.

The program storing unit stores an application program for processing the digital image data and an installation program for automatically installing the application program into the image processing device. The control unit controls the interface so that the control unit makes the image processing device recognize the program storing unit as an external storage which can be accessed by the image processing device, when the image data input device is connected to the image processing device.

Further, according to the present invention, there is provided an image data input device comprising a program storing unit and a control unit. The program storing unit stores an application program for processing the digital image data and an installation program for automatically installing the application program into the image processing device. The control unit controls the interface so that the image processing device can access the program storing unit, while the image data input device is connected to the image processing device.

BRIEF DESCRIPTION OF THE DRAWINGS

The objects and advantages of the present invention will be better understood from the following description, with reference to the accompanying drawings in which:

FIG. 10A is a view showing a screen of an LCD monitor, in which the ID number of the scanner unit is set;

FIG. 10B is a view showing the screen in which the ID number of the memory unit is set;

FIG. 10C is a view showing the screen in which an error message is indicated; and FIG. 11 is a view showing the screen which is indicated in the mount mode setting subroutine.

DESCRIPTION OF THE PREFERRED EMBODIMENTS

Figure 1:
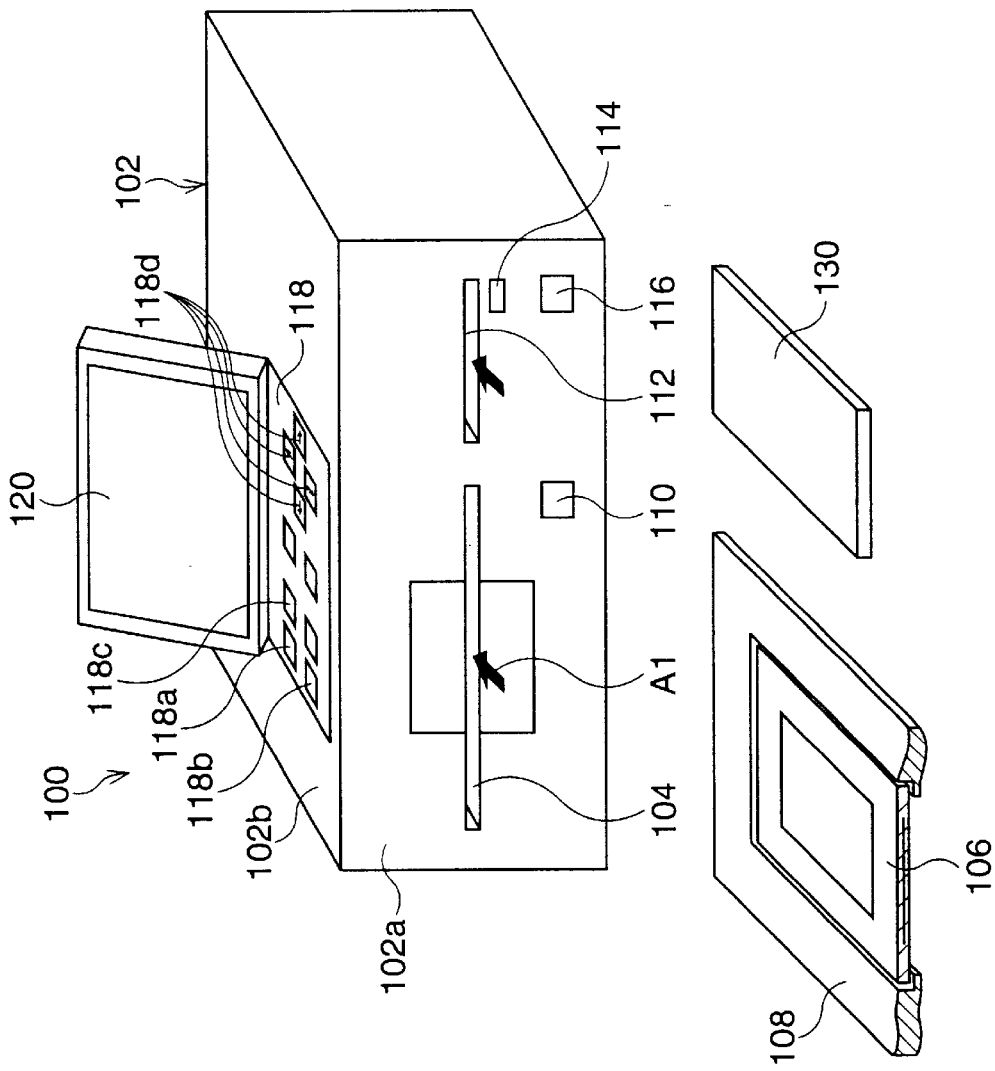
FIG. 1 is a perspective view showing an external appearance of a scanner, which is an embodiment of an image data input device of the present invention.

The present invention will be described below with reference to the embodiments shown in the drawings.

FIG. 1 is a perspective view showing an external appearance of a film scanner 100, which is an embodiment of an image data input device of the present invention. The scanner 100 has a box-shaped body 102. A front surface 102a of the body 102 is provided with a film insert slot 104, through which a tray 108 holding a silver halide film 106 is inserted along an arrow A1. In the drawing, the tray 108 and the film 106 are depicted partially cutaway. A film eject button 110 is disposed close to the film insert slot 104 to eject the tray 108 from the film insert slot 104.

A card slot 112 is provided on a right side of the film insert slot 104 on the front surface 102a to insert a memory card 130 for recording digital data of an image read by the scanner 100. A card eject button 114 is disposed close to the card slot 112 to eject the memory card 130 from the card slot 112. An electric power switch 116 is positioned on the right and bottom of the front surface 102a.

An operation panel 118 is provided on an upper surface 102b of the body 102. The operation panel 118 is provided with a plurality of button switches for commanding a start of reading an image from the film 106 and a record of the image to the memory card 130, and carrying out various kinds of settings and operations. Namely, the operation panel 118 includes an ID setting switch 118a, a mount mode switch 118b, a read start switch 118c and four direction switches 118d.

A liquid crystal display (LCD) monitor 120, which displays a read image of the silver halide film 106 and various kinds of messages, is mounted on the upper surface 102b. One side of the LCD monitor 120 is pivotably connected to the upper surface 102b, so that the inclination position of the LCD monitor 120 can be adjusted relative to the upper surface 102b, for easily observing the image on the LCD monitor 120.

Figure 2:
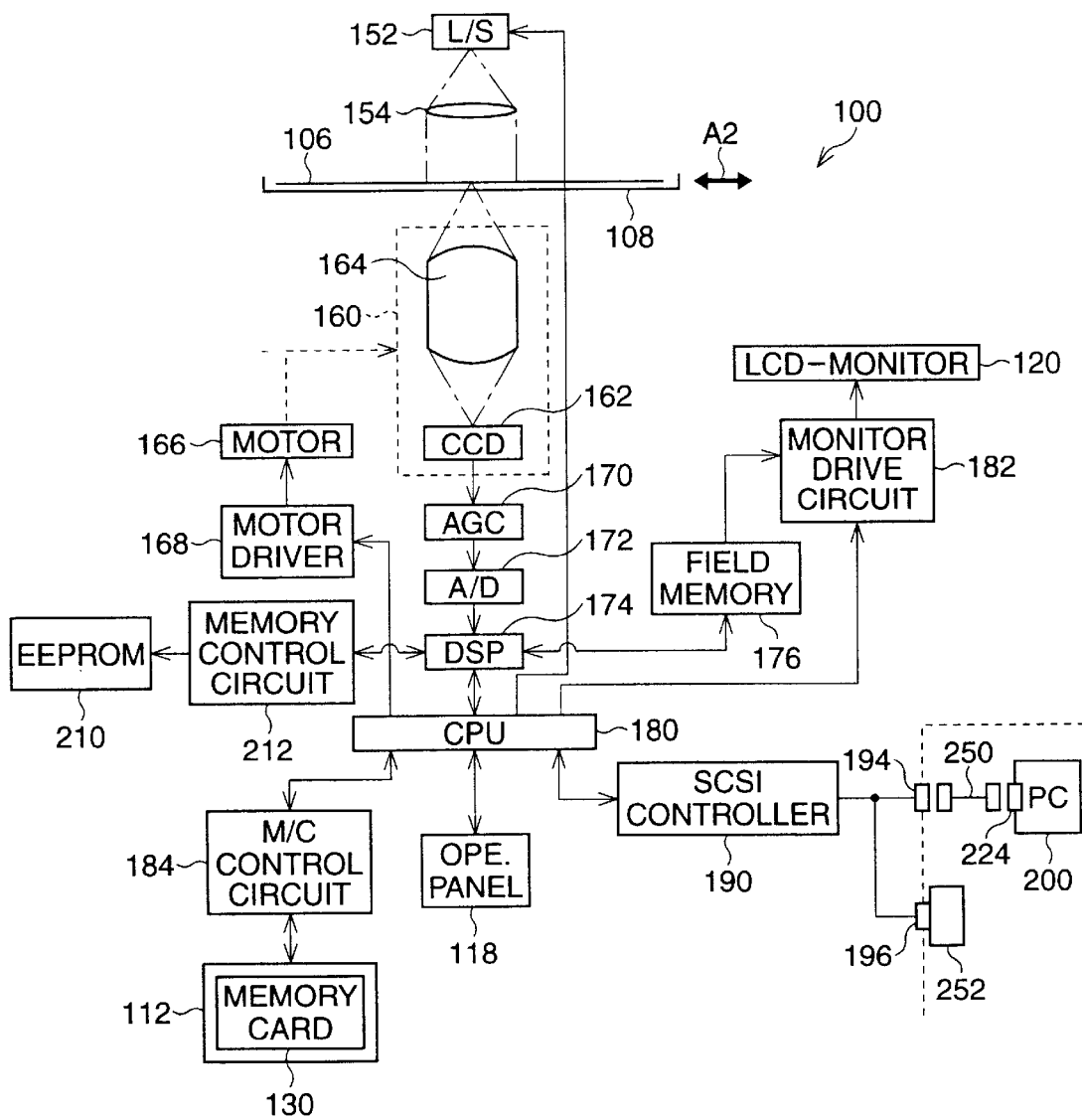
FIG. 2 is a block diagram indicating electric circuits of the scanner of FIG. 1.

FIG. 2 is a block diagram indicating electric circuits provided in the body 102. A light source 152 and an optical system 154, which directs light output from the light source 152 to the silver halide film 106, are disposed above the silver halide film 106. A scanning unit 160 is mounted opposite the light source 152 and the optical system 154, relative to the silver halide film 106.

The scanning unit 160 has a solid state imaging device (CCD) such as a linear sensor 162, which electric-converts light passing through the silver halide film 106, i.e., an optical image to an electric signal, and a photographing optical system 164, which forms the optical image on a light receiving surface of the linear sensor 162. The focusing operation of the photographing optical system 164 is performed by a motor 166, which is driven by a motor driver 168 under control of a central processing unit (CPU) 180.

The linear sensor 162 has a plurality of photodiodes (i.e., pixels) arranged in a longitudinal direction thereof, which corresponds to the width direction of the silver halide film 106, so that the image recorded in the silver halide film 106 is read by a predetermined amount. The tray 108, by which the silver halide film 106 is supported, is intermittently moved by the predetermined amount in a direction shown by an arrow A2. The reading operation of the linear sensor 162 and the intermittent movement of the tray 108 are consecutively repeated, so that the image of the silver halide film 106 is read strip by strip.

An output signal of the linear sensor 162 is amplified to an appropriate level by an automatic gain control (AGC) circuit 170. The amplified signal is A/D-converted to a digital signal by an A/D converter 172, and the digital image data are input to a digital signal processing circuit (DSP) 174, in which the digital image data are separated into RGB (red, green and blue) components and stored in a field memory 176. The field memory 176 has a capacity which is large enough to store one frame's worth of digital image data. When the digital image data of one frame's worth are stored in the field memory 176, the digital image data are read from the field memory 176 and input to the DSP 174, in which the digital image data are subjected to image processing such as a white balance adjustment, a gamma correction and a shading correction.

The image-processed digital image data are then output to a monitor drive circuit 182, in which the image data are converted to monitor image data corresponding to characteristics of the LCD monitor 120, so that an image, based on the monitor image data, is indicated on a screen of the LCD monitor 120.

If the operator desires, the digital image data can be recorded in the memory card 130 by operating the operation panel 118. Namely, based on instructions from the operation panel 118, the CPU 180 outputs the digital image data to a memory card control circuit 184, which compresses the digital image data according to a predetermined well known standard such as JPEG. The compressed image data are recorded in the memory card 130 inserted in the card slot 112.

The CPU 180 is provided for controlling the scanner 100 as a whole. Namely, the control includes operations of the circuits, such as an ON/OFF control of the light source 152, a focusing control of the photographing optical system 164, a reading operation of the linear sensor 162, a moving operation of the tray 108, an image indication of the LCD monitor 120, sending a record to the memory card 130, and synchronization of the operations in the circuits.

The scanner 100 is connected to a PC 200, which is an image processing device, through an interface designed in accordance with a predetermined standard such as SCSI (Small Computer System Interface). The SCSI is a well known interface for connecting peripheral equipment, such as a disk drive, a printer and a scanner, and so on to the PC.

Thus, the scanner 100 has a SCSI controller 190 and two connectors 194 and 196 connected to the SCSI controller 190. A connector 224 of The PC 200 is connected to the connector 194 through a SCSI cable 250, and a terminator 252 is connected to the connector 196.

Digital image data are output to the PC 200 through the SCSI controller 190, the connector 194 and the SCSI cable 250 in this order, in accordance with an output command signal from the PC 200. Note that the output of the digital image data to the PC 200 is performed through the SCSI cable 250, but may be performed via the memory card 130 which is an external recording medium.

The scanner 100 performs a reading operation of an image under control of the PC 200 when connected to the PC 200, and can perform the reading operation by depressing the read start switch 118c of the operation panel 118 when not connected to the PC 200.

The scanner 200 has an EEPROM 210, in which process data for operating each circuit, such as table data used for image processing, a filing process, and a control program executed in the CPU 180, are stored. Data and the program are read from the EEPROM 210 by a memory control circuit 212 under control of the DSP 174 and the CPU 180.

Figure 3:
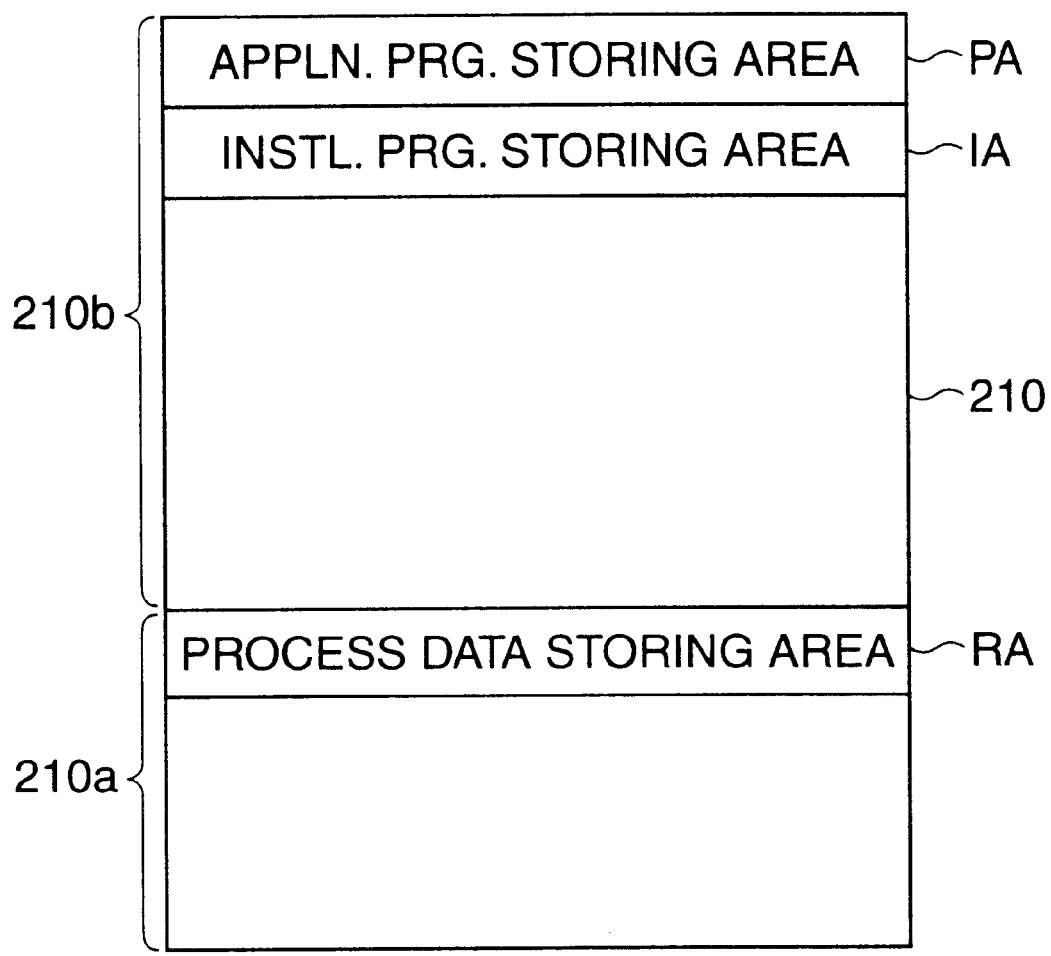
FIG. 3 is a view showing a memory map of an EEPROM shown in FIG. 2.

FIG. 3 shows a memory map of the EEPROM 210. The EEPROM 210 is composed of a working storage 210a and a formatting storage 210b. The working storage 210a has a process data storing area RA for storing the process data, and is used as a cache memory for an image processing performed by the DSP 174. The formatting storage 210b has an application program storing area PA and an installation program storing area IA.

Application programs, which are used for controlling the scanner 100 and processing digital image data, are compressed and stored in the application program storing area PA. The control of the scanner 100 and the process of the image data are carried out in the PC 200, and the application programs include drivers which are necessary to control the scanner 100. In the installation program storing area IA, an installation program for installing the application programs to the PC 200 is stored.

The formatting storage 210b of the EEPROM 210 is recognized by the PC 200 as an external storage when the scanner 100 and the PC 200 are connected, so that the programs are transmitted from the EEPROM 210 to the PC 200 according to the SCSI standard. The formatting area 210b is formatted based on the standard of the operating system of the PC 200, and when recognized as an external storage, the application programs and the installation program stored in the formatting area 210b are installed in the file system of the PC 200. The application programs and the installation program are designed according to the standard of the operating system. Therefore, the PC 200 can refer to the contents of the formatting area 210b, and can directly read and execute the installation program.

Note that it is preferable that a memory, in which the application programs and the installation program are stored, can store the programs and the programs can be rewritten even when the electric power of the PC 200 is turned OFF. It is more preferable to use an EEPROM, as in the embodiment, which does not need a battery for backup.

Figure 4:
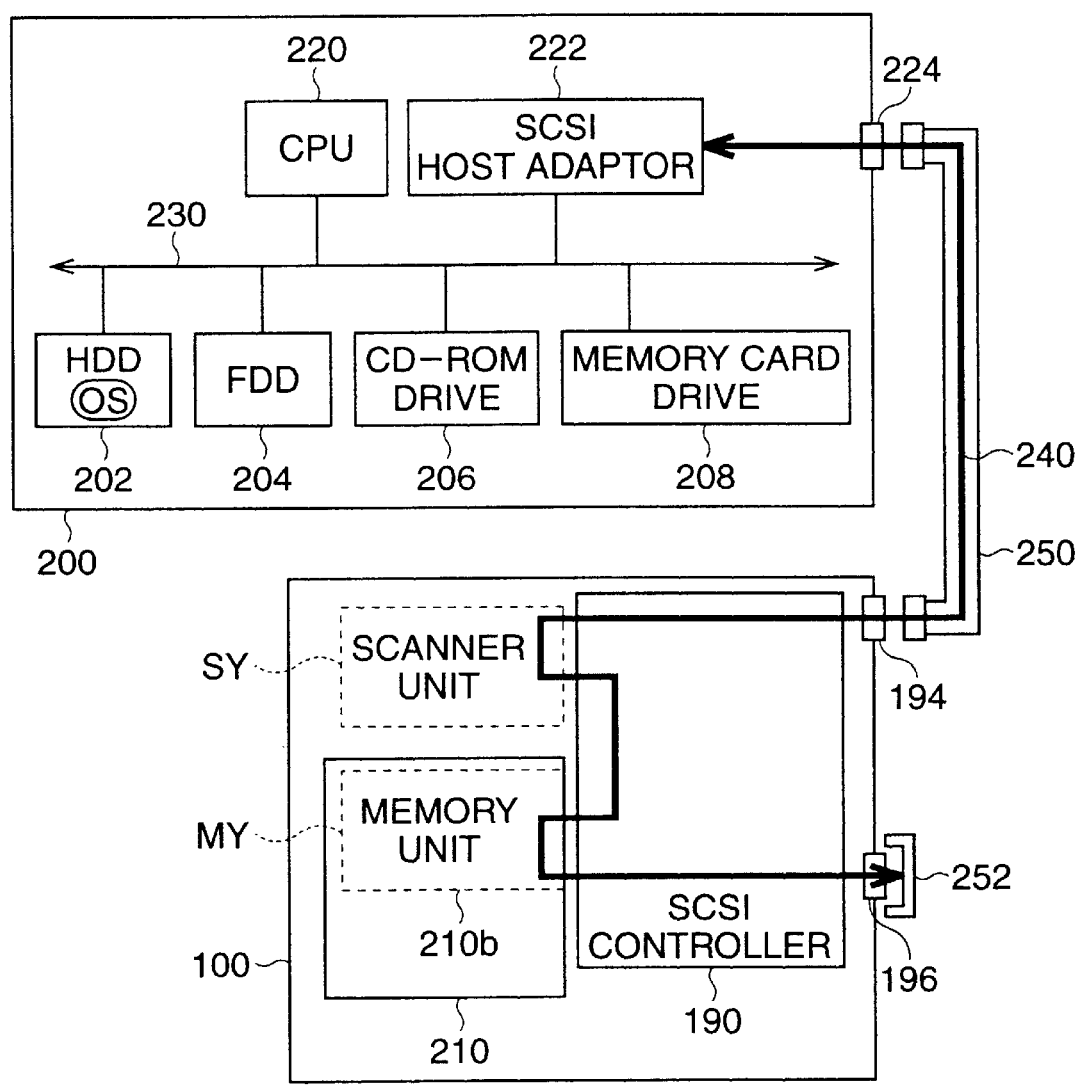
FIG. 4 is a view showing a daisy chain connection of the scanner and a personal computer.

FIG. 4 shows a connection between the scanner 100 and the PC 200. The PC 200 has a plurality of drives, which include a hard disk drive (HDD) 202, a floppy disk drive (FDD) 204, a CD-ROM drive 206 and a memory card drive 208, for example, and a CPU 220. The drives 202, 204, 206 and 208 and the CPU 220 are electrically connected to a system bus 230. An operating system such as the Windows 95 is stored in the HDD 202. Input devices including a monitor, a keyboard and a mouse are omitted in the drawing.

A SCSI host adapter 222 and the connector 224, each of which interfaces with the PC 200, are provided. The SCSI cable 250 is connected to the connector 224. Thus, the scanner 100 is always physically connected to the PC 200 through the SCSI cable 250.

The SCSI is a bus-type interface, and a SCSI bus 240 is connected to the system bus 230 through the SCSI host adapter 222. The scanner 100 is connected to the SCSI bus 240 through the SCSI controller 190. The SCSI bus 240 needs to be terminated by terminating resistances at the both ends. Thus, one end of the SCSI bus 240 is terminated by a terminating circuit, which is provided in the PC 200 and not shown in the drawing, and the other end of the SCSI bus 240 is terminated by the terminator 252.

In the scanner 100, circuits which can read an image, and the formatting area 210b of the EEPROM 210, are theoretically defined as separate logical units (shown by broken lines in the drawing). In this specification, these logical units are referred to as a scanner unit SY and a memory unit MY, respectively. Namely, three SCSI devices, which are the PC 200, the scanner unit SY and the memory unit MY, are connected to the SCSI bus 240 in series (i.e., daisy chain connection).

To each of the three SCSI devices, an ID number, which is used for setting the priority of accessing the SCSI bus 240 and discriminating each of the SCSI devices and is one of 0 through 7, is allocated in such a manner that the ID numbers do not conflict with each other. The ID number "7", which allows the top priority for using the SCSI bus 240, is set to the PC 200 which controls the scanner 100, and ID numbers less than "7", which may be "0" or "1", for example, are set to each of the units SY and MY which are controlled by the PC 200. The ID number of the PC 200 is fixed to "7" in advance, and the ID number of each of the units SY and MY is arbitrarily set by manually operating the operation panel 118.

When electric power is supplied to the scanner 100 and the PC 200, in this order, while each of the ID numbers is set and the scanner 100 and the PC 200 are physically connected, the CPU 220 of the PC 200 reads the operating system from the HDD 202 and executes it. Thus, during the execution of the operating system, the PC 200 obtains the right of access to the SCSI bus 240, so that a logical connection to each of the scanner unit SY and the memory unit MY is established. Namely, the PC 200 recognizes the scanner unit SY and the memory unit MY.

After the logical connection is established, the scanner unit SY and the memory unit MY are controlled by the CPU 180 in accordance with a command output from the PC 200. Namely, the scanner 100 can read an image and perform a filing operation, a compression operation and a transmission of data, and the programs stored in the memory unit MY can be accessed.

The PC 200 assigns or mounts the memory unit MY into the file system along with each of the devices 202, 204, 206 and 208. For example, if the HDD 202 is mounted to the C directory (i.e., C:\), the FDD 204 is mounted to the A directory (i.e., A:\), the CD-ROM drive 206 is mounted to the D directory (D:\) and the memory card drive 208 is mounted to the E directory (i.e., E:\), respectively, the memory unit MY is mounted to the H directory (i.e., H:\), so that the CPU 220 can directly access the installation program stored in the memory unit MY.

Note that the scanner 100 can cancel the setting of the ID number of the memory unit MY. When the setting is canceled, the PC 200 can recognize only the scanner unit SY, and therefore the PC 200 cannot access the memory unit MY.

While the PC 200 recognizes the memory unit MY, if installation is instructed by the CPU 220, i.e., if the installation program is read and executed, the compressed application program is transmitted from the memory unit MY to the PC 200 according to the installation program, and unfolded by the CPU 220 and installed to the HDD 202. The installation operation may be designed in such a manner that the installation program stored in the EEPROM 210 is automatically started when the scanner 100 is connected to the PC 200, or in such a manner that the execution of the installation program is manually instructed from the PC 200.

As described above, since the application program and the installation program are stored in the scanner 100, an external recording medium such as a CD-ROM does not need be provided, and therefore the management of an external recording medium is unnecessary. Further, the operator only has to connect the scanner 100 to the PC 200, and thus the installation operation is very simple. Furthermore, since the application program and the installation program are stored in the EEPROM 210, which can be rewritten, updating of a program, for example, is very easy.

On the other hand, although in this embodiment the SCSI standard is adopted as the interface for connecting the scanner 100 and the PC 200, other interfaces such as the USB standard and the IEEE1394, by which the PC 200 can recognize the memory (i.e., the EEPROM 210) and data can be recorded to and read from the memory, can be utilized. In this case, the SCSI controller 190 and the connectors 194 and 196, provided in the scanner 100, and the SCSI host adapter 222, the connector 224 and the SCSI cable 250, which are provided in the PC 200, are replaced with those in conformity with the interface standard which is adopted.

Figure 5:
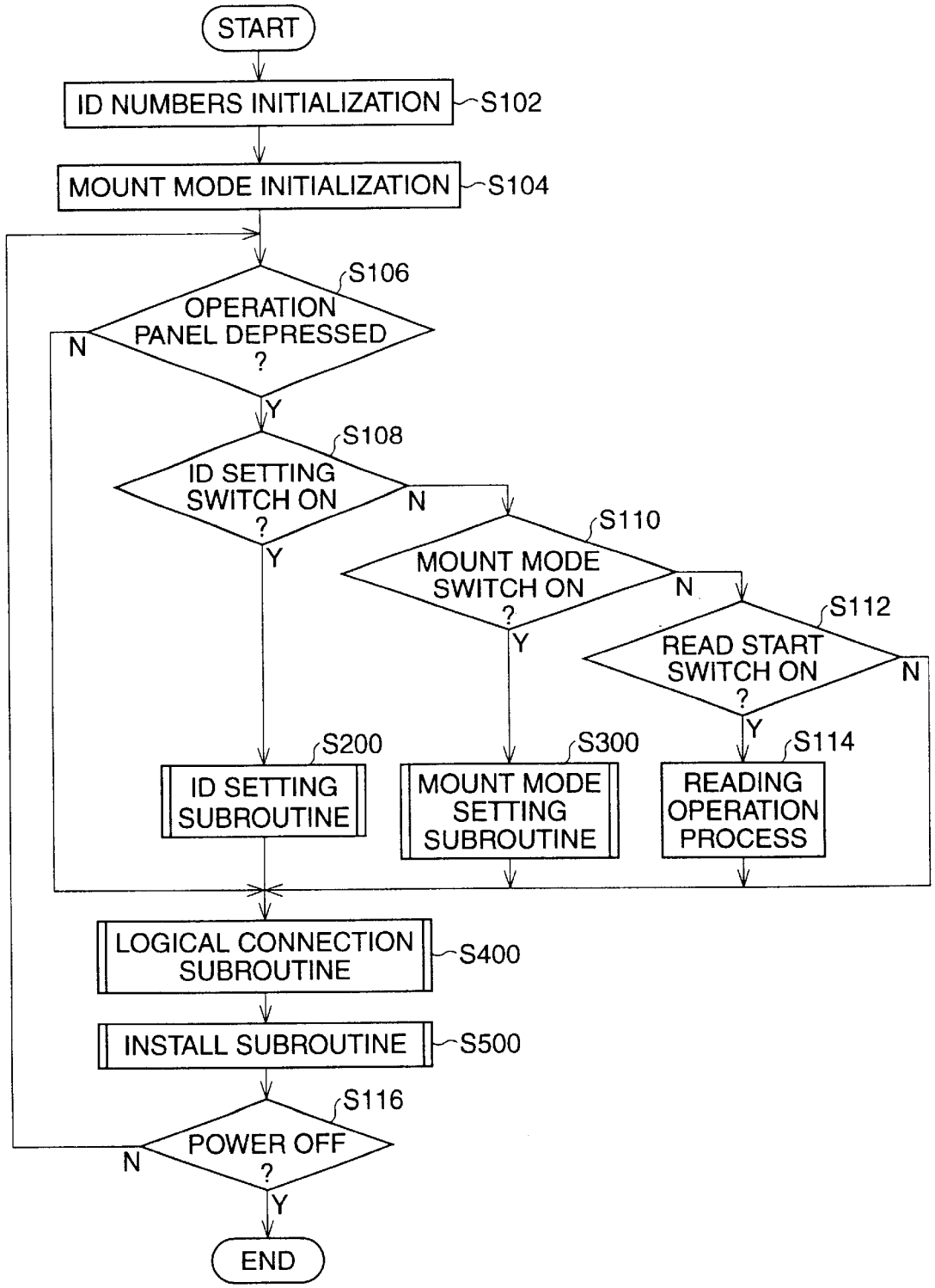
FIG. 5 is a flow chart of a main routine executed by a CPU of the scanner shown in FIG. 2.

With reference to FIGS. 5 through 11, an operation of the scanner 100 is described below. FIG. 5 shows a flow chart of a main routine executed by the CPU 180, and FIGS. 6 through 9 are flow charts of sub-routines executed in the main routine. FIGS. 10a, 10b, 10c and 11 show screens of the LCD monitor 120 in an ID setting process and a mount mode setting process.

By executing these routines, two parameters "A" and "B" are determined. The parameter "A" is set to a value of an ID number which is to be allocated to the scanner unit SY, and the parameter "B" is set to a value of an ID number which is to be allocated to the memory unit MY. When the scanner 100 is manufactured and forwarded from the factory, each of the ID numbers is set to "1" and "0", respectively, and is stored in the process data storing area RA of the EEPROM 210.

Further, by these routines, two flags "F_M" and "F_I" are determined. The flag "F_M" is used for judging whether or not the memory unit MY is to be mounted, and thus indicates amount mode. Namely, when the flag "F_M" is 0, amount release mode, in which the memory unit MY is not mounted once the installation operation is carried out, is being set, and when the flag "F_M" is 1, a mount setting mode, in which the memory unit MY is always mounted, is being set. Thus, the mount mode includes the mount release mode and the mount setting mode. On the other hand, the flag "F_I" is used for judging whether or not the installation operation to the PC 200 has been completed. Namely, when the flag "F_I" is 0, the installation operation has not been completed, and when the flag "F_I" is 1, the install operation has been completed. The initial value of each of the flags "F_M" and "F_I" is set to 1 when the scanner 100 is manufactured and forwarded from the factory, and is stored in the process data storing area RA of the EEPROM 210.

When electric power to the scanner 100 is turned ON and the main routine is started, Step S102 is executed, in which ID numbers allocated to the scanner unit SY and the memory unit MY are read from the process data storing area RA, and are substituted for the parameters "A" and "B". Step S104 is then executed in which the flags "F_M" and "F_I" are read from the process data storing area RA, so that a mount mode corresponding to each of the flags is set.

Thus, when initial settings are completed in Steps S102 and S104, the process goes to Step S106, in which it is determined whether any switch included in the operation panel 118 is depressed. If any switch is depressed, it is determined in Step S108 whether the switch is the ID setting switch 118a, it is determined in Step S110 whether the switch is the mount mode switch 118b, or it is determined in Step S112 whether the switch is the read start switch 118c.

When the ID setting switch 118a is depressed, the process goes from Step S108 to Step S200 in which an ID setting subroutine is executed, so that the ID numbers of the scanner unit SY and the memory unit MY are set or changed.

When the mount mode switch 118b is depressed, the process goes from Step S110 to Step S300 in which a mount mode setting subroutine is executed, so that the mount mode is set or changed.

When the read start switch 118c is depressed, the process goes from Step S112 to Step S114 in which a reading operation process is performed, so that an image is read, digital image data are generated, and the other operations are carried out. Note that the reading operation process is well known, and therefore, the description thereof is omitted.

When each process of Steps S200, S300 and S114 ends, when it is determined in Step S106 that the operation panel 118 is not depressed, or when Step S112 is executed to determine any one of the switches 118a, 118b and 118c are not depressed, a logical connection subroutine is executed in Step S400, an installation subroutine is executed in Step S500, and it is then determined in Step S116 whether the electric power is turned OFF. If the electric power is not turned OFF, the process goes back to Step S106, and if the electric power is turned OFF, the main routine ends.

Figure 6:
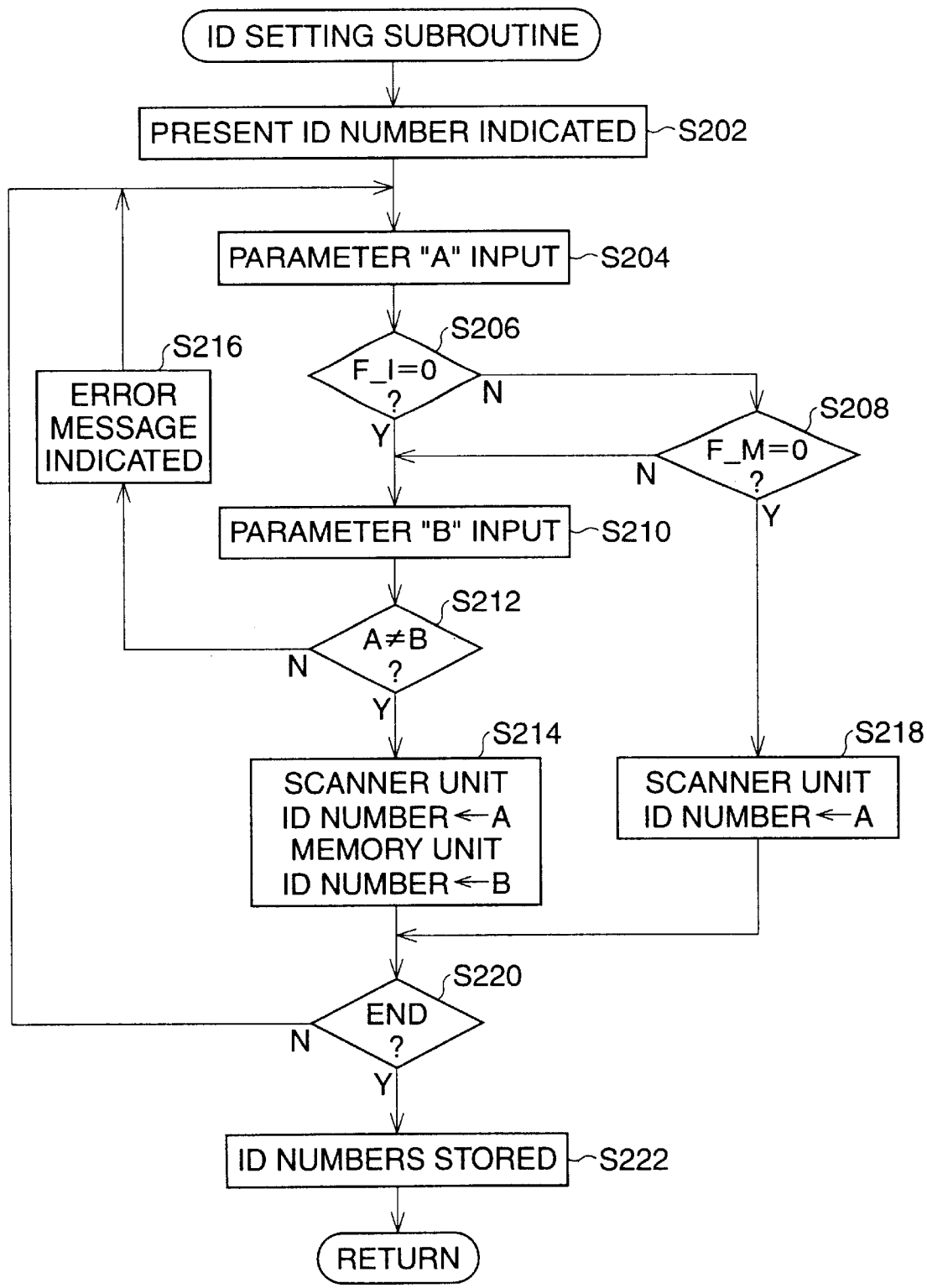
FIG. 6 is a flow chart of an ID setting subroutine.

FIG. 6 is a flow chart of the ID setting subroutine executed in Step S200 of the main routine. In Step S202, an ID number, which is now being set, is indicated by the LCD monitor 120, as shown in FIG. 10A. Namely, the ID number of the scanner unit SY, i.e., the value of the parameter "A" is indicated in a highlighted state, and an arrow implying that the ID number can be changed is indicated on the left side of the characters of "SCANNER UNIT". The value of the parameter "A" can be changed in Step S204 from "1", which is being set at present, to an arbitral value which is 0 or from 2 through 7, by operating a right or left key, for example, included in the direction switches 118d.

When the value of the parameter "A" is changed or is not changed, if an upper or lower key, for example, included in the direction switches 118d is operated, the process goes to Step S206, in which it is determined whether the parameter "F_I" is 0. When the parameter "F_I" is 0, i.e., when an application program has not been installed in the PC 200, the process goes to Step S210. Similarly, when the application program has been installed and it is determined in Step S208 that the parameter "F_M" is 1, which implies that the mount setting mode is being set, the process also goes to Step S210. In Step S210, the ID number of the memory unit MY is set.

FIG. 10B is a screen on which the ID number of the memory unit MY can be set. Namely, the ID number of the memory unit MY, i.e., the value of the parameter "B" is indicated in a highlighted state, and an arrow implying that the ID number can be changed is moved to the left side of the characters of "MEMORY UNIT". In Step S210, the value of the parameter "B" can be changed from "0", which is being set at present, to an arbitral value from 1 through 7, by operating the direction switches 118d. The process then goes to Step 212.

In Step S212, in order to prohibit the ID numbers decided in Steps S204 and S210 from duplicating each other, it is determined whether the parameters "A" and "B" have different values from each other. When the parameters coincide with each other, Step S216 is executed, in which an error message is indicated on the screen as shown in FIG. 10C, and the process then goes back to Step S204 to set again the parameter "A", i.e., the ID number of the scanner unit SY.

Conversely, when it is determined in Step S212 that the parameters "A" and "B" are different from each other, Step S214 is executed, in which the values of the parameters "A" and "B", renewed in Steps S204 and S210, are fixed as the ID numbers of the scanner unit SY and the memory unit MY.

When an application program is installed in the PC 200 (i.e., the parameter "F_I" is 1 in Step S206) and the mount release mode is set (i.e., the parameter "F_M" is 0 in Step S208), the application program need not be installed again, and thus the memory unit MY need not be mounted. Therefore, without performing the setting operation of the ID numbers, the process goes to Step S218. Accordingly, even if the upper and lower keys of the direction switches 118d are operated, the process does not go to a step in which the screen shown in FIG. 10B is indicated.

In Step S218, the value of the parameter "A" renewed in Step S204 is fixed as the ID number of the scanner unit SY, and the ID number of the memory unit MY is not set.

After setting the ID numbers or number in Step S214 or S218, Step S220 is executed, in which it is determined whether the ID setting subroutine is to end. Namely, it is determined whether the switch 118b or 118c has been depressed. When the ID setting subroutine is to end, Step S222 is executed, in which the values or value fixed in Step S214 or Step S218 are or is stored in the process data storing area RA of the EEPROM 210. Conversely, when the ID setting subroutine is not to end, so that the ID numbers are again renewed, the process goes back to Step S204.

Figure 7:
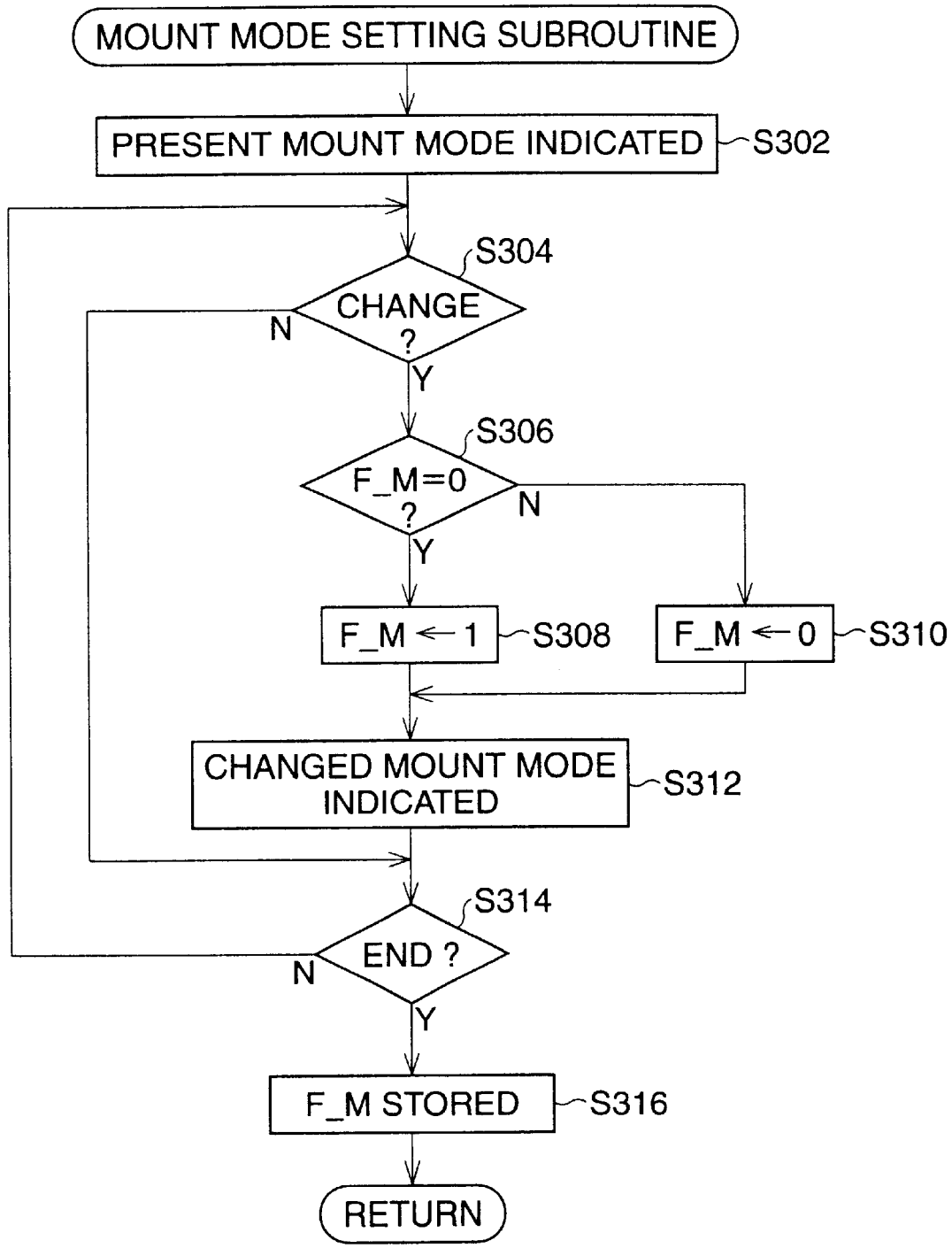
FIG. 7 is a flow chart of amount mode setting subroutine.

FIG. 7 is a flow chart of the mount mode setting subroutine executed in Step S300 of the main routine. In Step 302, the value of the flag "F_M" corresponding to the mount mode, which is being set at present, is indicated by the LCD monitor 120, as shown by reference P1 in FIG. 11. In a state shown by reference P1, the value of flag "F_M" is 0 and emphasized by a highlighted indication. The value of the flag "F_M" can be changed in Step S304 from 0 to 1, by operating any one of the keys included in the direction switches 118d.

When the change is instructed in Step S304, the process goes to Step S306, in which it is determined whether the value of the present flag "F_M" is 0. When the value is 0, Step S308 is executed so that the flag "F_M" is changed to 1, and when the value is 1, Step S310 is executed so that the flag "F_M" is changed to 0. Then, Step S312 is executed in which the contents of the screen of the LCD monitor 120 are changed based on the value renewed in Step S308 or S310. For example, when the value is changed from 0 to 1, the screen is changed from the first state P1 to the second state P2, and thus the numeral shown in a highlighted state is changed. After Step S312, or when the change is not instructed in Step S304, the process goes to Step S314.

In Step S314, it is determined whether the mount mode setting subroutine is to end. Namely, it is determined whether either switch 118a or 118c has been depressed. When the mount mode setting subroutine is to end, Step S316 is executed, in which the value of the flag "F_M" changed in Step S308 or Step S310 is stored in the process data storing area RA of the EEPROM 210. Conversely, when the mount mode setting subroutine is not to end, so that the mount mode setting is again renewed, the process goes back to Step S304.

Thus, when one of the direction switches 118d is depressed, the screen is cyclically changed between the states P1 and P2 as shown in FIG. 11, and when the other switch 118a or 118c is depressed, the mount mode setting subroutine ends.

Figure 8:
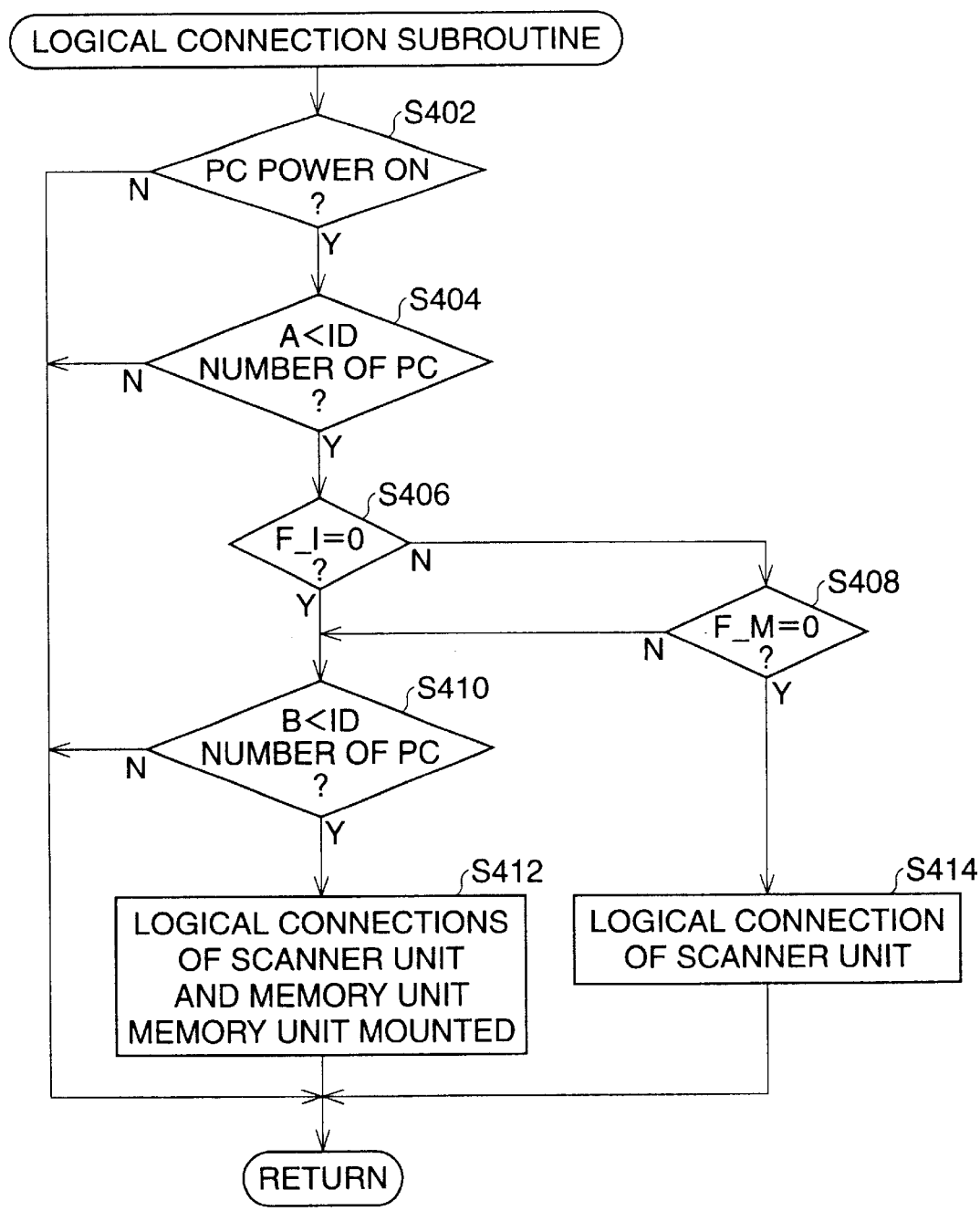
FIG. 8 is a flow chart of a logical connection subroutine.

FIG. 8 is a flow chart of the logical connection subroutine executed in Step S400 of the main routine. In Step S402, it is determined whether the electric power of the PC 200 is turned ON and a state, in which the right of access to the SCSI bus 240 is requested, is sensed. When the state is sensed, the process goes to Step S404.

In Step S404, it is determined whether the value of the parameter "A", i.e., the ID number of the scanner unit SY is less than the ID number (usually set to 7) of the PC 200. When the value is less than the ID number of the PC 200, the process goes to Step S406, in which it is determined whether the flag "F_I" is 0, i.e., whether an application program has not been installed yet. When the application program has not been installed, the process goes to Step S410. Also, when it is determined in Step S406 that the flag "F_I" is 1 and it is determined in Step S408 that the flag "F_M" is 1 which means the mount setting mode, the process goes to Step S410.

In Step S410, it is determined whether the value of the parameter "B", i.e., the ID number of the memory unit MY is less than the ID number of the PC 200. When the value is less than the ID number of the PC 200, the process goes to Step S412, logical connections of the scanner unit SY and the memory unit MY to the PC 200 are established based on the set ID numbers, and the memory unit MY is mounted to the PC 200. Thus, both the scanner unit SY and the memory unit MY are recognized by the PC 200, and the logical connection subroutine ends.

When it is determined in Step S406 that an application program has been installed in the PC 200 and it is determined in Step S408 that the flag "F_M" is 0, which means that the mount release mode is set, since the application program does not need be installed, Step S414 is executed, in which the memory unit MY is not recognized and only the scanner unit SY is recognized by the PC 200. Thus, the logical connection subroutine ends.

Note that, when it is not sensed in Step S402 that the electric power of the PC 200 is turned ON, the logical connection subroutine ends without executing Steps S404 through S414. Similarly, when it is determined in Step S404 or S410 that the parameter "A" or "B" is not less than the ID number of the PC 200, the logical connection subroutine ends without executing Steps S406 though S414.

Figure 9:
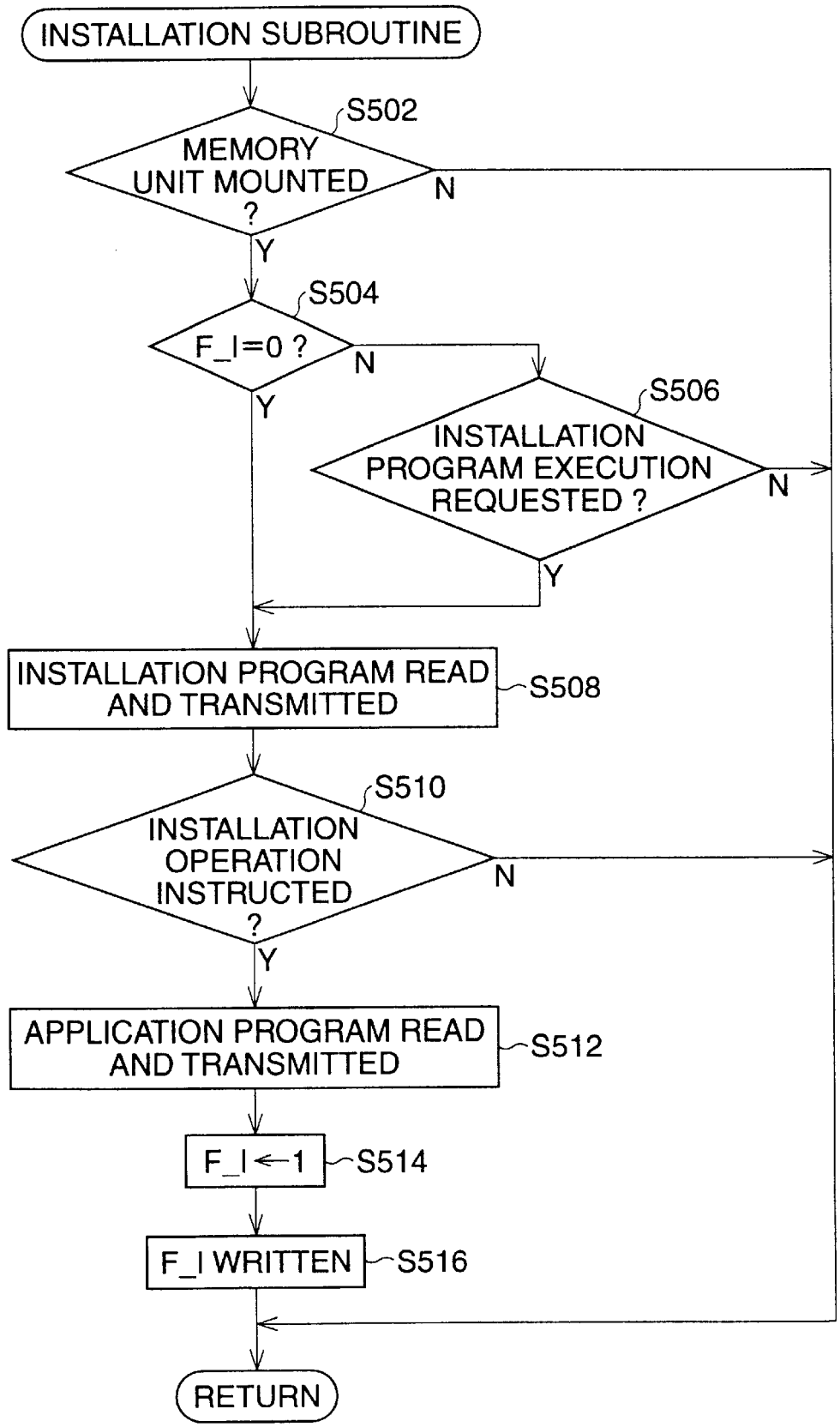
FIG. 9 is a flow chart of an installation subroutine.

FIG. 9 is a flow chart of the install subroutine executed in Step S500 of the main routine. In Step S502, it is determined whether the memory unit MY was mounted to the PC 200 by the logical connection subroutine which was previously executed. When the memory unit MY was not mounted to the PC 200, since the install operation cannot be performed, the install subroutine ends. Conversely, when the memory unit MY was mounted, the process goes to Step S504.

In Step S504, it is determined whether the flag "F_I" is 0, i.e., the installation operation has been performed. When the installation operation has not been performed, the process goes to Step S508. Conversely, when the installation operation has been performed, although the flag "F_I" is 0, the installation operation can be compulsorily performed if the execution of the installation operation is requested by the PC 200 in Step S506.

In Step S508, the installation program is read from the formatting area 210b of the EEPROM 210, which is the memory unit MY, and transmitted to the PC 200, so that the installation program is executed by the CPU 220 of the PC 200. In Step S510, when a command is output by the PC 200 to start the execution of the installation operation, Step S512 is executed, in which an application program is read from the formatting area 210b and transmitted to the PC 200. Thus, the application program is installed in the PC 200.

When transmission is completed, the process goes to Step S514, in which the value of the flag "F_I" is changed to 1. In Step S516, the value is written to the process data storing area RA of the EEPROM 210, and the installation subroutine ends.

As described above, the scanner 100 of the embodiment has the EEPROM 210 which is utilized by the PC 200 as an external storage, and the application programs and the installation program for installing the application programs are stored in the EEPROM 210. Therefore, the installation operation of the application programs to the PC 200, for the scanner 100, is very easy for a beginner.

The mount of the EEPROM 210 is carried out only in the initial phase during which the installation operation has not yet been performed, or only when the installation operation has to be performed again. Therefore, the PC 200 does not have to have a memory corresponding to the EEPROM 210 when only the scanner unit SY is driven, and thus the load on the PC 200 is reduced, thereby improving the throughput of the PC 200. Further, the mount mode can be freely changed by the user.

Note that the present invention is not restricted to the scanner, but can be applied to any device including an electronic still camera and so on, which can output digital image data to a PC.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-089056 (filed on Mar. 28, 2000) which is expressly incorporated herein, by reference, in its entirety.

What is claimed is:

1. An image data input device, which is separate from and is connected to an image processing device through an interface so that digital image data are generated based on an optical image of an object and input to said image processing device, said image data input device comprising:

a program storing unit, in said image data input device, that stores an application program for processing said digital image data and an installation program for automatically installing said application program into said image processing device; and a control unit that controls said interface so that said control unit makes said image processing device recognize said program storing unit as an external storage which can be accessed by said image processing device, when said image data input device is connected to said image processing device.

2. An image data input device according to claim 1, further comprising a linear sensor that reads said optical image recorded in a silver halide film to generate said digital image data.

3. An image data input device according to claim 1, wherein said program storing unit comprises an EEPROM.

4. An image data input device according to claim 1, wherein said control unit makes said image processing device recognize said program storing unit as said external storage until said application program is installed into said image processing device.

5. An image data input device according to claim 1, wherein said control unit can operate in a mode in which said control unit always makes said image processing device recognize said program storing unit as said external storage after said application program is installed into said image processing device, said mode being able to be activated and disabled arbitrarily.

6. An image data input device, which is separate from and connected to an image processing device through an interface so that digital image data are generated based on an optical image of an object and input to said image processing device, said image data input device comprising:

a program storing unit, in said image data input device, that stores an application program for processing said digital image data and an installation program for automatically installing said application program into said image processing device; and a control unit that controls said interface so that said image processing device can access said program storing unit, while said image data input device is connected to said image processing device.

* * * * *